United States Patent
Pankaj et al.

(10) Patent No.: US 10,517,207 B2
(45) Date of Patent: Dec. 31, 2019

(54) PROGRAMMABLE ONE-TOUCH RAISE FEATURE FOR AN AGRICULTURAL HARVESTER SUCH AS A WINDROWER

(71) Applicant: CNH Industrial America LLC, New Holland, PA (US)

(72) Inventors: Madhu Pankaj, West Chester, PA (US); Robert L. Fackler, Ephrata, PA (US); Roger D. Huggard, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 49 days.

(21) Appl. No.: 15/583,477

(22) Filed: May 1, 2017

(65) Prior Publication Data

US 2017/0311541 A1   Nov. 2, 2017

Related U.S. Application Data

(60) Provisional application No. 62/330,580, filed on May 2, 2016.

(51) Int. Cl.
| | |
|---|---|
| *A01D 34/00* | (2006.01) |
| *A01D 57/28* | (2006.01) |
| *A01D 34/04* | (2006.01) |
| A01D 101/00 | (2006.01) |

(52) U.S. Cl.
CPC ........... *A01D 34/006* (2013.01); *A01D 34/04* (2013.01); *A01D 57/28* (2013.01); *A01D 2101/00* (2013.01)

(58) Field of Classification Search
CPC ...... A01D 34/006; A01D 57/28; A01D 34/04; A01D 2101/00
See application file for complete search history.

(56) References Cited

U.S. PATENT DOCUMENTS

| | | | | |
|---|---|---|---|---|
| 5,235,511 A | * | 8/1993 | Middleton | ............ E02F 9/2045 172/4 |
| 5,359,836 A | * | 11/1994 | Zeuner | ................. A01D 41/141 56/10.2 E |
| 5,469,694 A | | 11/1995 | Panousheck et al. | |
| 5,713,190 A | * | 2/1998 | Vermeulen | ........... A01D 41/141 56/10.2 E |
| 6,029,764 A | * | 2/2000 | Schubert | ............ B62D 33/0608 180/89.12 |
| 6,169,953 B1 | * | 1/2001 | Panoushek | ............. G01K 3/005 123/198 D |

(Continued)

FOREIGN PATENT DOCUMENTS

GB       1 413 221       11/1975

*Primary Examiner* — Rodney A Butler

(74) *Attorney, Agent, or Firm* — Patrick M. Sheldrake; Peter K. Zacharias

(57) ABSTRACT

An agricultural vehicle including a chassis and a header carried by the chassis and including a cutter mechanism. The header is adjustable in a vertical direction. The agricultural vehicle also includes a header actuator connected to the header and configured to adjust the header in the vertical direction, and a controller coupled to the header actuator. The controller is configured for receiving an input command for controlling an operation of the header actuator to achieve a lifting height, operating the header actuator in conformance with the input command, and terminating the operating of the header actuator.

14 Claims, 6 Drawing Sheets

(56) References Cited

U.S. PATENT DOCUMENTS

| | | | |
|---|---|---|---|
| 6,871,483 B1 | 3/2005 | Panoushek | |
| 7,869,922 B2 | 1/2011 | Otto et al. | |
| 8,626,408 B1 * | 1/2014 | Satzler | A01B 69/003 111/18 |
| 8,966,871 B2 | 3/2015 | Nafziger et al. | |
| 9,043,955 B2 | 6/2015 | Nafziger et al. | |
| 9,888,081 B1 * | 2/2018 | Farinelli, Jr. | H04W 40/20 |
| 2005/0028504 A1 * | 2/2005 | Gramm | A01D 41/06 56/208 |
| 2006/0180371 A1 * | 8/2006 | Breed | G07C 5/008 180/197 |
| 2007/0068129 A1 * | 3/2007 | Strosser | A01D 41/141 56/10.2 E |
| 2008/0177449 A1 * | 7/2008 | Pickett | A01D 41/141 701/50 |
| 2010/0287898 A1 * | 11/2010 | Ringwald | A01D 41/141 56/10.2 E |
| 2011/0099962 A1 * | 5/2011 | Coers | A01D 41/141 56/10.4 |
| 2015/0033692 A1 * | 2/2015 | Schroeder | A01D 34/008 56/10.2 E |

* cited by examiner

PROGRAMMABLE ONE-TOUCH RAISE FEATURE FOR AN AGRICULTURAL HARVESTER SUCH AS A WINDROWER

CROSS REFERENCE TO RELATED APPLICATIONS

This is a non-provisional application based upon U.S. provisional patent application Ser. No. 62/330,580, entitled "PROGRAMMABLE ONE-TOUCH RAISE FEATURE FOR AN AGRICULTURAL HARVESTER SUCH AS A WINDROWER", filed May 2, 2016, which is incorporated herein by reference.

BACKGROUND OF THE INVENTION

1. Field of the Invention

The present invention relates generally to agricultural harvesters, and, more particularly, to self-propelled windrowers.

2. Description of the Related Art

Self-propelled windrowers are utilized by farmers to cut crop material as the windrower advances across a field and to arrange the cut crop material into windrows to dry. The windrows are deposited onto the field behind the windrower. Typical windrowers have a header at the front to cut the crop material, and are driven by a pair of primary wheels linked to a power source, such as an internal combustion engine, and a pair of caster wheels at the rear of the windrower. Some windrowers are further equipped with a roller, referred to as a swath roller, near the rear of the windrower. The swath roller trails the header and rolls the crop material as the windrower advances, making the windrowed crop material less susceptible to disruption from wind. It is desirable to maintain the integrity of the windrow to facilitate drying in a field and to facilitate subsequent gathering of the windrowed crop material.

In a typical windrowing procedure, a field is opened for harvesting by making one or several passes with the windrower at opposite ends of the field to form so-called headlands, and to thereafter make subsequent passes in a back-and-forth pattern between the headlands and perpendicular to the headlands. During such a procedure, when one pass is completed between headlands, the windrower is turned in the reached headland to commence a subsequent pass from that headland to the headland at the opposite end of the field. Accordingly, the windrower traverses over windrows previously formed in the headlands at each end of the field when turning around. While it is necessary to drive over the windrows in the headlands while making the turn, it is desirable to minimize as much as possible any disruption to the overall structure of the windrows. Accordingly, the operator will raise the harvesting head of the windrower upon completing a pass and will maintain the elevated position of the header while turning the windrower to proceed back in the opposite direction. Systems are known for raising the header and commonly provide for raising to a single preset limit each and every time, in each and every field, under every and all conditions.

While such systems have achieved a level of success, they do include inefficiencies. The height of windrows formed during a harvesting procedure can vary significantly, depending upon many factors, including but not limited to the type of crop being harvested, the condition of the crop including such things as maturity, moisture content and crop density, atmospheric conditions and the operating conditions of the windrower itself. Raising the header to a single, pre-established height, typically a maximum height, may be required in only a few harvesting situations; whereas, raising to a much lower height may be adequate in as many or more harvesting situations. Preferably, in each situation, the header is raised only as far as necessary and no further. Raising the header farther than necessary can be wasteful in time and causes unnecessary wear on the system by the system being active for a longer time and through a longer range than is necessary.

It is known to provide systems that raise until stopped, which may include raising continuously while a switch is activated and stopping upon the switch being deactivated. Such a system requires that the operator maintain control of the switch throughout the raising process. This can be distracting to the operator if his attention is required on other tasks when turning the windrower. Further, the operator can disengage the switch unintentionally, thereby causing the header to stop raising at an inadequate level. The header may then drag through the established windrows in the headland, which can disturb the windrow integrity significantly.

What is needed in the art is a windrower that can overcome some of the previously described disadvantages of known windrowers.

SUMMARY OF THE INVENTION

The present invention provides an agricultural vehicle with a controller that is configured for receiving operator inputted header lifting requirements and controlling a header lift actuator in response to the inputted header lifting requirements.

The invention in one form is directed to an agricultural vehicle including a chassis and a header carried by the chassis and including a cutter mechanism. The header is adjustable in a vertical direction. The agricultural vehicle also includes a header actuator connected to the header and configured to adjust the header in the vertical direction, and a controller coupled to the header actuator. The controller is configured for receiving an input command for controlling an operation of the header actuator to achieve a lifting height, operating the header actuator in conformance with the input command, and terminating the operating of the header actuator.

The invention in another form is directed to a method of controlling an agricultural vehicle. The agricultural vehicle includes a header that is adjustable in a vertical direction while harvesting a crop and forming a windrow that has a windrow height. The method includes the step of determining one of a distance for raising the header in the vertical direction and a time period for raising the header in the vertical direction to achieve a lifting height that is dependent on said windrow height. The method includes the additional steps of initiating a vertical adjustment of the header and ascertaining when the lifting height has been achieved. The lifting height may be achieved by one of: determining a distance the header has been raised and comparing the distance the header has been raised to the distance for raising the header in the vertical direction to achieve the lifting height. The method also includes the step of determining a time period over which the vertical adjustment has occurred and comparing the time period over which the vertical adjustment has occurred to the time period for raising the header in the vertical direction to achieve the lifting height.

The method also includes stopping the vertical adjustment of the header upon achieving the lifting height.

The invention in yet another form is directed to an agricultural vehicle that includes a chassis and a header carried by the chassis. The header is adjustable in a vertical direction. The agricultural vehicle also includes a header actuator connected to the header and configured to adjust the header in the vertical direction. The agricultural vehicle also includes a swath roller carried by the chassis and configured for forming a windrow having a windrow height. The swath roller is adjustable in the vertical direction. The agricultural vehicle also includes a roller actuator connected to the swath roller and configured to adjust the swath roller in the vertical direction. The agricultural vehicle also includes a controller coupled to the header actuator and the roller actuator. The controller is configured for receiving an input command and controlling an operation of the header actuator and an operation of the roller actuator to raise the header and swath roller to a lifting height in order to pass above the windrow.

An advantage of the present invention is that a header can be raised to a minimal amount sufficient for the operation, and need not be lifted higher than required when traveling over previously cut crop material.

Another advantage of the present invention is that the controller can be responsive to operator activation when starting to turn the implement and/or can query location positioning systems to determine when to raise the header.

Yet another advantage of the present invention is that the controller can be configured to raise the header a distance that considers changing conditions of the windrowed crop material.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
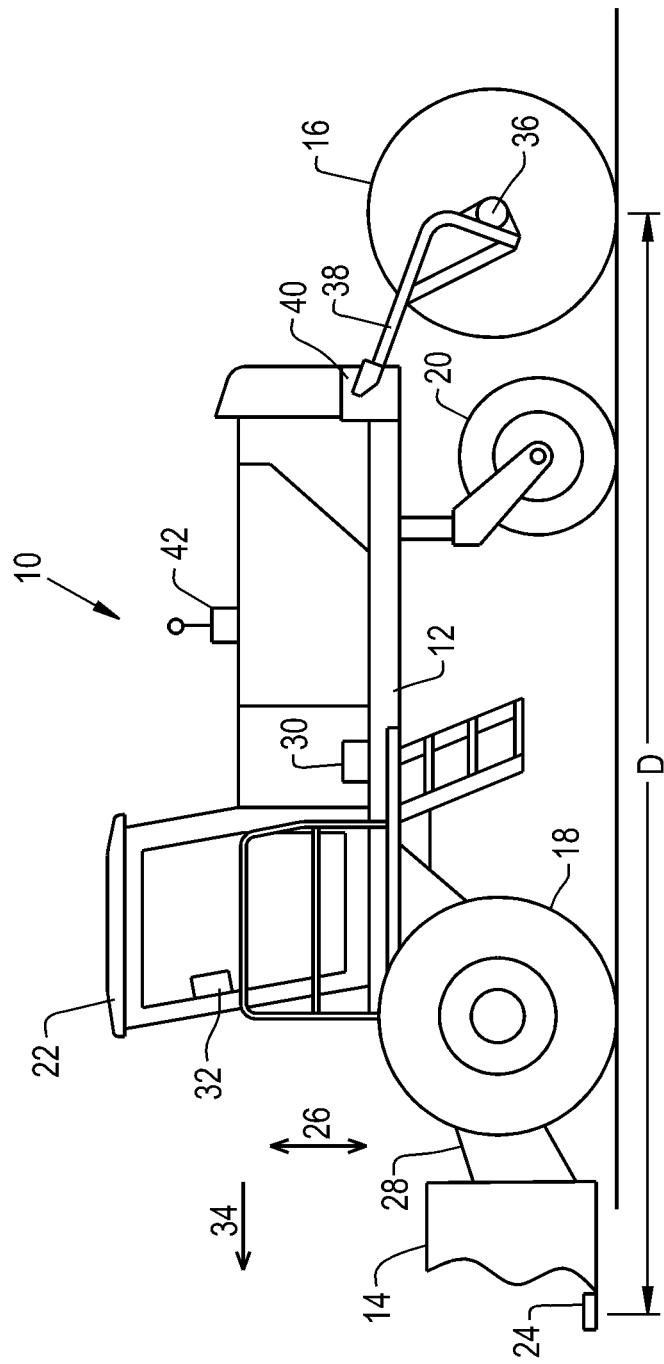
FIG. 1 is a side view of an embodiment of a self-propelled windrower according to the present invention, shown with a header and a swath roller in a lowered position.

Referring now to the drawings, and more particularly to FIG. 1, there is shown an embodiment of a self-propelled windrower 10 according to the present invention, which generally includes a chassis 12, a header 14 carried by the chassis 12, and a swath roller 16 carried by the chassis 12 behind the header 14. For propulsion across a field, the windrower 10 includes a pair of primary wheels 18 at a front of the windrower 10 that are driven by a power source, such as an internal combustion engine (not shown). The windrower 10 also includes a pair of caster wheels 20 at a rear of the windrower 10. While the windrower 10 is shown as including both primary wheels 18 and caster wheels 20, any arrangement of wheels can be used to propel the windrower 10 across a field, with the present arrangement being shown as an example only. The windrower 10 also has an operator cab 22 at the front of the windrower 10 where an operator will control functions of the windrower 10 as the windrower 10 travels across a field.

Figure 3:
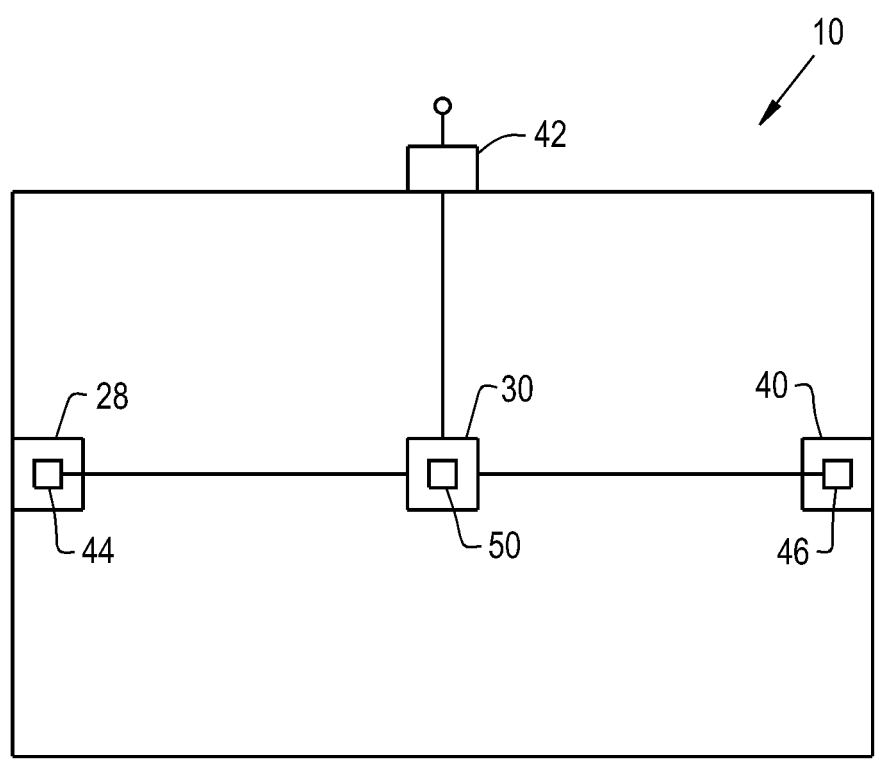
FIG. 3 is a schematic view of various components of the self-propelled windrower shown in FIGS. 1-2.

The header 14 includes a cutter mechanism 24 to cut crop material as the windrower 10 advances across a field. The cutter mechanism 24 can be any sort of mechanism, such as the cutter bar shown, that can cut crop material from the field. The header 14 can also include a reel (not shown) to direct uncut crop material toward the cutter mechanism 24 and a conveying mechanism (not shown) to direct crop material toward a center of the header 14 to produce crop windrows as the windrower 10 advances across the field. The header 14 is adjustable in a vertical direction, designated by arrow 26, by a header actuator 28 connected to the header 14 and the chassis 12. The header actuator 28 can include, for example, a hydraulic or pneumatic cylinder linked to the header 14 that utilizes fluid pressure to raise and lower the header 14. A controller 30 can be linked to the header actuator 28, as shown in FIG. 3, and receive commands from an operator in the operator cab 22 to signal the header actuator 28 to raise or lower the header 14. The operator may, for example, utilize a physical switch (not shown) located in the cab 22 to cause the controller 30 to signal and activate the header actuator 28, or the operator can press a graphic image in a graphical user interface shown on a touchscreen display 32 in the cab 22 to cause the controller 30 to signal and activate the header actuator 28. Such arrangements are known in the art and therefore require no further description.

Figure 2:
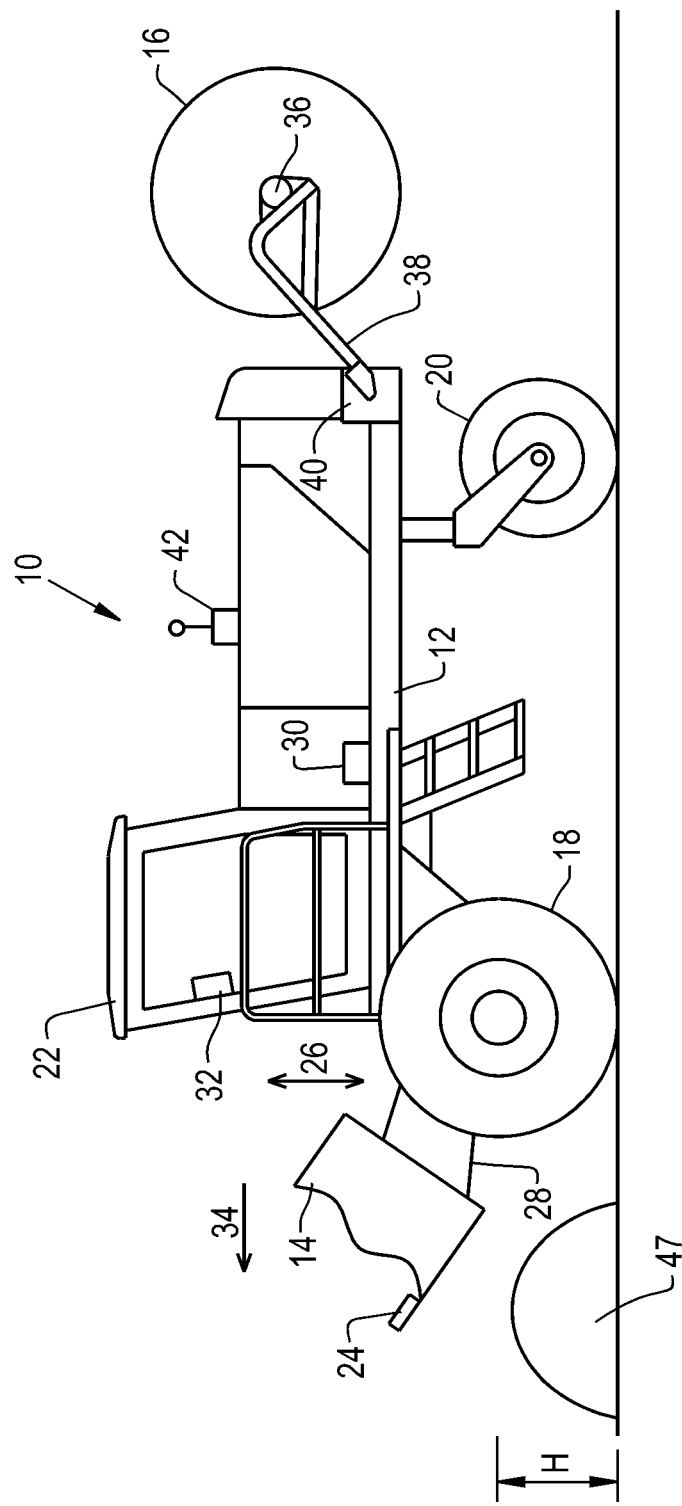
FIG. 2 is a side view of the self-propelled windrower shown in FIG. 1 with the header and swath roller in a raised position for traveling over previously formed windrows.

As shown in FIG. 1, the header 14 is lowered to a level that allows the cutter bar 24 to cut crop material as the windrower 10 advances in a forward travel direction 34. Once the cutter bar 24 reaches the end of its cut, such as when the windrower reaches the edge of the uncut crop adjacent a previously formed headland, the operator can activate the controller 30 to signal the header actuator 28 to raise the header 14 in the vertical direction 26 so the header 14 raises to allow the windrower 10 to complete a turning operation traveling over previously formed windrows, as shown in FIG. 2. Alternatively, the windrower 10 can be an automatically guided windrower where the controller 30 is pre-configured to raise the header 14 at various points in the field, which will be described further herein.

The swath roller 16 trails the header 14 and rolls across the field so that, as the windrower 10 advances in the field, the swath roller 16 engages crop material which has been cut by the header 14 and rolls the cut crop material into more densely packed windrows that are resistant to crop material loss due to blowing wind. The swath roller 16 can be formed as a tapering wheel with a varying diameter, with two lateral ends of the swath roller 16 having a greatest diameter of the roller 16 and a center of the swath roller 16 having a smallest diameter of the roller 16. It should be appreciated that other geometries of the swath roller 16 can also be utilized, so long as the swath roller 16 can roll across the field as the windrower 10 travels across the field. The swath roller 16 pivots about a roller axle 36 which can be linked to a pair of roller arms 38, one at each lateral end of the swath roller 16, which are connected to a roller actuator 40 mounted to the rear of the windrower 10 which can raise and lower the swath roller 16. The roller actuator 40 raises and lowers the swath roller 16 analogously to the header actuator 28 which raises and lowers the header 14. The roller actuator 40 can be in the form of a hydraulic or pneumatic actuator. The roller actuator 40 is coupled to the controller 30, as shown in FIG. 3, which is configured to signal the roller actuator 40 to move the swath roller 16 in the vertical direction 26 when desired.

As the windrower 10 advances in the forward travel direction 34, the cutter bar 24 of the header 14 will cut crop material for windrowing. After the crop material is cut, the header 14 deposits the cut crop material behind the header 14 in the path of the forwardly advancing swath roller 16, which will roll over the cut crop material and more densely pack the windrow. Once the header 14 has been advanced sufficiently to finish a cut, the header 14 can be raised to prepare for a turn. The header 14 as shown in FIG. 2 is in the raised position. Due to the swath roller 16 trailing the header 14 by a separation distance D, the windrower 10 must travel at least the separation distance D past where the header 14 is raised before raising the swath roller 16 to its raised position, which is also shown in FIG. 2. Once the header 14 and swath roller 16 are in their respectively raised positions, the windrower 10 can be turned without risking damage to the header 14 or swath roller 16 and without unnecessary disturbance to any previously formed windrows over which the windrower travels while completing its turn.

Referring now collectively to FIGS. 1-3, the controller 30 may include a memory 50. The controller 30 can be any type of element that is capable of receiving and sending electronic signals according to a set of instructions. For example, the controller 30 may be in the form of an electronic control unit (ECU). The controller 30 may be coupled to the header actuator 28 and to the roller actuator 40 and can receive an input command for controlling the header actuator 28 and/or the roller 16 to raise the header 14 and/or the roller 16 to achieve a lifting height H. The lifting height H may be dependent upon the height of the windrows 47 such that the lifting height H is the height at which the header 14 efficiently passes above and clears the windrows 47 without causing unnecessary wear on the system by clearing the windrows by too great a distance. It should be appreciated that the header 14 and roller 16 may be raised to the same lifting height H or raised to separate lifting heights in order to clear the windrows 47.

The controller 30 may also be coupled to a location sensor 42, such as a Global Positioning Satellite (GPS) sensor, which determines the current geographic location of the windrower 10 and sends a geographic location signal to the controller 30. The location sensor 42 can be any type of sensor capable of gathering positional information about the windrower 10. The controller 30 can therefore be coupled to the header actuator 28, the roller actuator 40, and the location sensor 42 to allow the controller 30 to gather positional information about the windrower 10, in general, and the header 14 and swath roller 16, specifically. The controller 30 also can be coupled to solenoid valves 44 and 46 of the header actuator 28 and the roller actuator 40, respectively. The controller 30 may signal the header actuator 28 and roller actuator 40 to activate and raise or lower the linked header 14 and swath roller 16 when desired by selectively activating the respective solenoid valve 44, 46 of the actuators 28 and 40. Coupling the controller 30 to the location sensor 42 and the actuators 28 and 40 allows the controller 30 to determine the location of windrower 10 and to automatically raise and lower the header 14 and the swath roller 16 in response to movement of the windrower 10 in the forward travel direction 34.

Figure 4:
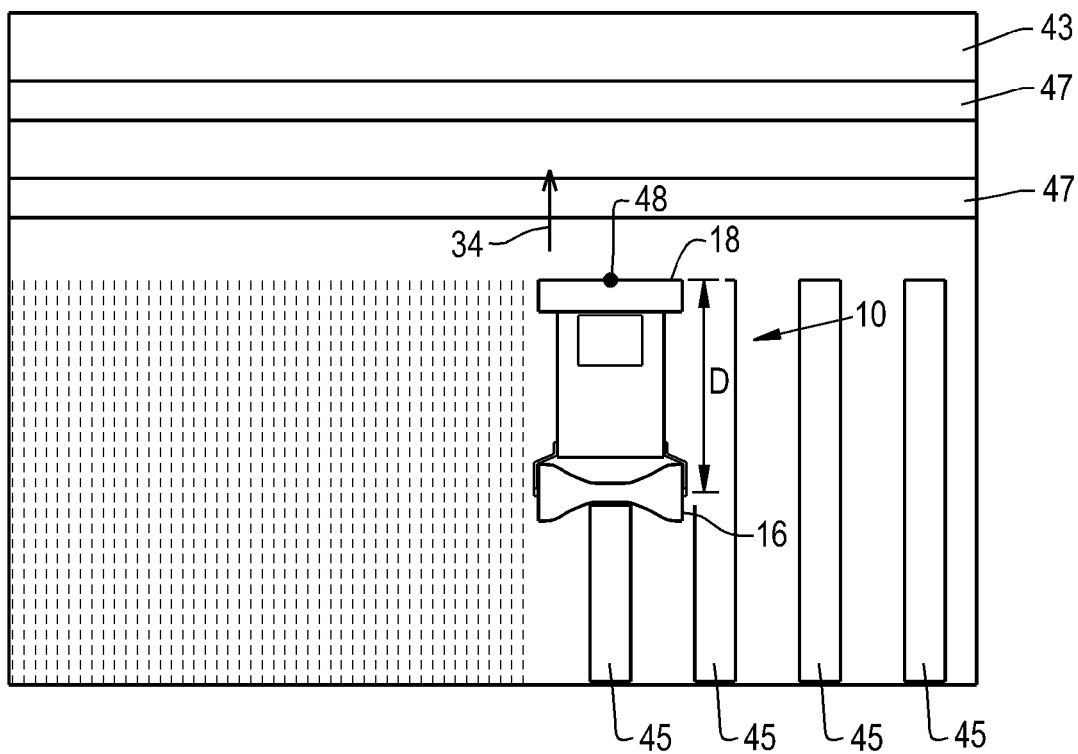
FIG. 4 is a top view of the self-propelled windrower shown in FIG. 1 advancing across a field and raising the header of the windrower.

Referring now to FIG. 4, a top view of the windrower 10 in a field is shown. The windrower 10 has traveled across the field such that the cutter bar 24 of the header 14 has reached the end of the cut, as windrower 10 approaches a headland 43. The swath roller 16 has rolled most of the cut crop into a rolled windrow 45 behind windrower 10, which is generally parallel to other windrows 45 previously formed by windrower 10 and generally perpendicular to windrows 47 contained in the headland 43. Since the header 14 has reached the end of the cut, the header 14 can be raised as windrower 10 enters headland 43. The header 14 can be raised to the lifting height H (FIG. 2) sufficient to clear the windrows 47. The header 14 need not be raised to a height greater than the lifting height H.

The controller 30 can determine when the header 14 has been raised to the lifting height H in a variety of ways. For example, the controller 30 can query a position sensor located in the header actuator 28 to determine the elevation of header 14 when lifting is started. Subsequent queries of the position sensor can be used to determine when the lifting height H is achieved. For example, the controller 30 may compare the position of the header 14 that is sensed by the position sensor to the lifting height H, and the controller 30 may continue actuating the header actuator 28 until the sensed position of the header 14 is substantially the same as the lifting height H. By way of further example, the controller 30 can terminate operation of the header actuator 28 after a specific time period of operation that corresponds to the lifting height H. In this regard, the controller 30 may determine a time period over which the vertical adjustment has occurred, and the controller 30 may compare the determined time period to the specific time period of operation. Once the determined time period over which the adjustment is substantially the same as the specific time period of operation, the controller 30 may stop the vertical height adjustment, i.e. cease operation of the header actuator 29 upon achieving the lifting height H.

The desired lifting height H can be determined in numerous ways. For example, the desired lifting height H can be stored in the memory 50 of the controller 30 as a constant value for a given crop. Thereby, when the windrower 10 is set up for harvesting a crop, the appropriate lifting height H will be used. Alternatively, the lifting height H can be determined by the operator inputting a specified lifting height H, inputting a specified duration for operating the header actuator 28 in the lifting mode that corresponds to raising the header 14 to the lifting height H, and inputting data relating to the height of the windrows 47 obtained from any of a variety of observing and recording sensors to determine the existing height of windrows 47. As another alternative, the lifting height H can be specified by a crop height sensor that is located on the windrower 10 and operably coupled to the controller 30. The crop height sensor may sense the height of the windrows 47 and send a corresponding signal to the controller 30 to define the lifting height H based of the height of the windrows 47.

An operation to raise the header 14 and the swath roller 16 can be initiated manually through activation of a physical or graphic switch by the operator and/or automatically through the use of a sufficiently accurate position sensing system. Thereby, in manual operation, the controller 30 may be configured to receive an operator input command of a prescribed distance for raising the header 14, or alternatively the controller 30 may receive an operator input command for operating the header actuator 28 over a prescribed time period. Also, an operator may cause the header 14 to raise at a header raising point 48 by manually initiating operation of header actuator 28, as described above. Alternatively, the controller 30 can also be configured as an auto-guidance unit with multiple header raising points 48 saved in the memory 50 of the controller 30. In such a case, the controller 30 can be configured to automatically signal the header actuator 28 to raise the header 14 once the header 14 reaches a location, e.g., the header raising point 48, that is determined by the location sensor 42.

After the windrower 10 has finished turning, the operator can then activate the controller 30 to signal the header actuator 28 to lower the header 14 to the cutting position, which is shown in FIG. 1. To avoid premature lowering of the header 14 and swath roller 16 during a turn, the controller 30 can be configured to prevent sending a lowering signal to the header actuator 28 and roller actuator 40 while the windrower 10 is turning. Alternatively, the header 14 may be lowered at a header lowering point, which can be detected and recorded by the controller 30 analogous to the header raising point 48 previously described herein. In the case of an auto-guidance controller, multiple header lowering points can be stored in memory 50 of the controller 30, similarly to the previously described storing of header raising points. It should therefore be appreciated that the controller 30 according to the present invention can be configured in a variety of ways to coordinate raising and lowering of the header 14 and swath roller 16.

Figure 5:
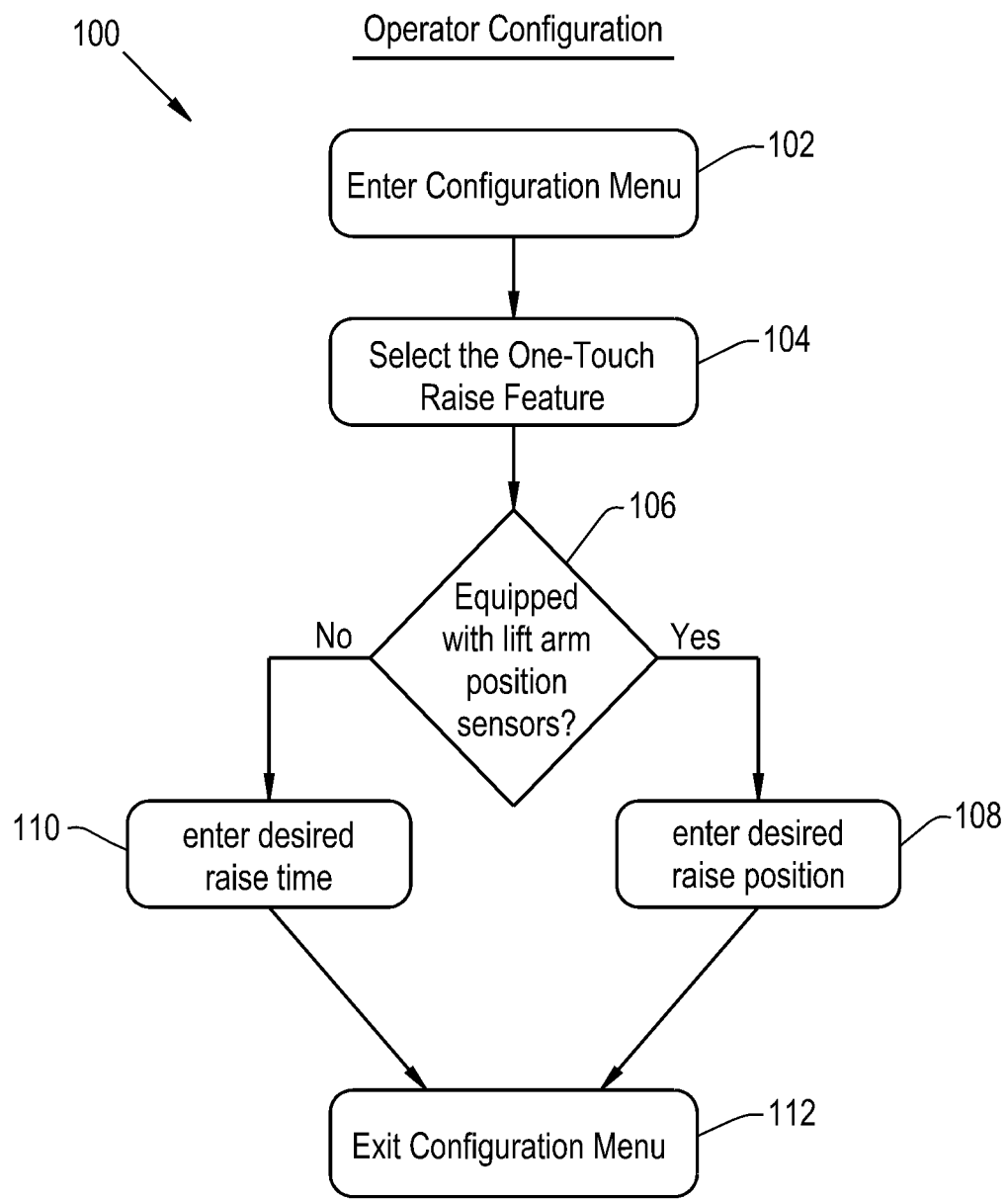
FIG. 5 is a flow chart of an embodiment of a method according to the present invention.

Referring now to FIG. 5, there is shown a flow chart of an embodiment of a method 100 for an operator of the windrower 10 to configure lift control according to the present invention. The method 100 can begin by the operator entering 102 the configuration menu and selecting 104 from available options, such as, for example, a one touch raise feature to be controlled by the operator activating a switch (physical or graphic) to initiate lifting. Alternatively, auto-guidance can be used to establish header lifting and/or lowering points. The method 100 determines 106 available options relevant to the equipment configuration. If the windrower is equipped with lift arm position sensors the actual lift arm position change can be used to control the lifting height H. Accordingly, the operator proceeds by entering 108 the desired raised position, which may be an arithmetic value for a distance of lifting height H. Alternatively, if the windrower is not equipped with lift arm position sensors, a time duration can be used to operate the header actuator 28 for a sufficient duration of time to achieve the lifting height H. Accordingly, the operator would proceed by entering 110 the desired duration of time for operating the header actuator 28 to achieve the lifting height H. Configuration is completed by the operator exiting 112 the configuration menu.

Figure 6:
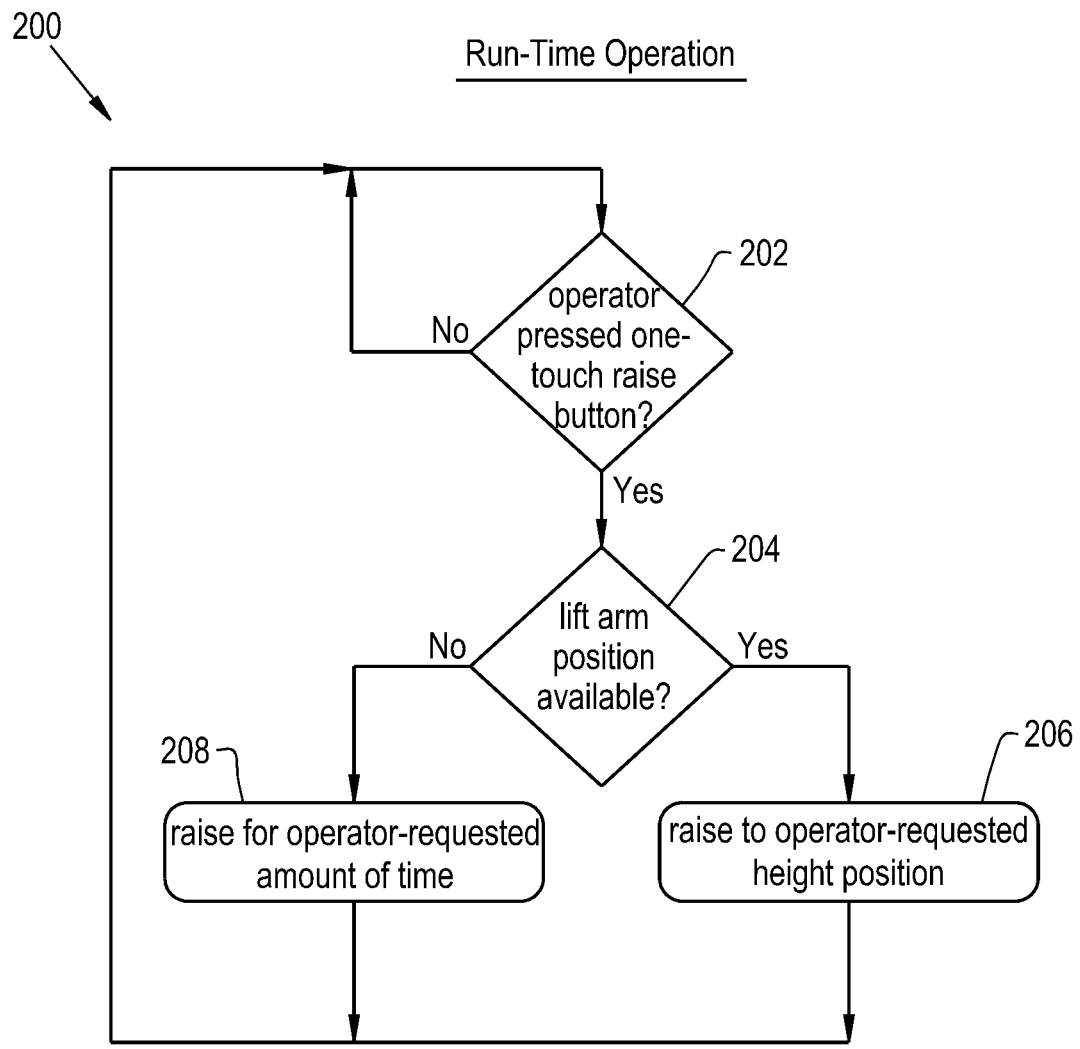
FIG. 6 is a flow chart of another embodiment of a method according to the present invention.

Referring now to FIG. 6, there is shown a flow chart of an embodiment of a method 200 being performed by the windrower 10 for the run time operation of the header actuator 28 as described herein. Runtime operation method 200 follows from the operator configuration method 100 described above. The run time operation method 200 begins by detecting 202 that the operator has activated a switch to initiate a lifting cycle. Alternatively, the run time operation method can begin by determining from auto guidance software that windrower 10 has reached a predetermined header raising point 48. The method continues by detecting 204 if lift arm position sensors are available on the windrower. If position sensors are available, the method continues by raising 206 to the operator inputted height position, and then stopping. If position sensors are not available, the run-time operation method 200 continues by raising 208 for the operator requested time duration, and thereafter stopping.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural vehicle comprising:
   a chassis;
   a header carried by said chassis and including a cutter mechanism, said header configured for forming a windrow having a windrow height, and said header being adjustable in a vertical direction;
   a header actuator connected to said header and configured to adjust said header in the vertical direction; and
   a controller coupled to said header actuator, said controller being configured for:
   receiving an input command for controlling an operation of the header actuator to achieve a lifting height;
   determining one of a distance for raising the header in the vertical direction and a time period for raising the header in the vertical direction to achieve a lifting height that is dependent on the windrow height;
   initiating a vertical adjustment of the header with the header actuator;
   stopping the vertical adjustment of the header upon achieving said lifting height.

2. The agricultural vehicle according to claim 1, wherein said controller is further configured for determining whether said operating of the header actuator is in compliance with said input command.

3. The agricultural vehicle according to claim 1, wherein said controller is further configured for:
   detecting a distance moved by said header during said operation of the header actuator;
   receiving an operator input command for raising said header a prescribed distance; and
   terminating the operating of the header actuator after achieving said lifting height.

4. The agricultural vehicle according to claim 1, wherein said controller is further configured for:
   determining a time period over which said header actuator has been operating;
   receiving an operator input command for operating said header actuator over a prescribed time period; and
   terminating the operating of the header after operating said header actuator for said prescribed time period.

5. The agricultural vehicle according to claim 1, further comprising a location sensor coupled to said controller.

6. The agricultural vehicle according to claim 5, wherein said controller is further configured for commencing said operating of the header actuator in response to a location determined by said location sensor.

7. The agricultural vehicle according to claim 1, wherein said agricultural vehicle further includes a switch that is coupled to said controller; and said controller is further configured for commencing said operating of the header actuator in response to activating said switch.

8. The agricultural vehicle according to claim 7, wherein said switch is one of a physical switch and a graphic image in a graphical user interface shown on a touchscreen display.

9. A method of controlling an agricultural vehicle including a header being adjustable in a vertical direction while harvesting a crop and forming a windrow having a windrow height, said method comprising the steps of:

determining one of a distance for raising the header in the vertical direction and a time period for raising the header in the vertical direction to achieve a lifting height that is dependent on said windrow height;

initiating a vertical adjustment of the header;

ascertaining when said lifting height has been achieved by one of:

determining a distance the header has been raised and comparing the distance the header has been raised to said distance for raising the header in the vertical direction to achieve the lifting height; and determining a time period over which the vertical adjustment has occurred and comparing the time period over which the vertical adjustment has occurred to said time period for raising the header in the vertical direction to achieve the lifting height; and stopping the vertical adjustment of the header upon achieving said lifting height.

10. The method according to claim 9, wherein said step of initiating the vertical adjustment of the header is initiated by an operator inputting a command by activating a switch.

11. The method according to claim 10, wherein said switch is at least one of a physical switch and a graphic image in a graphical user interface shown on a touchscreen display.

12. The method according to claim 9, wherein said agricultural vehicle further includes a controller.

13. The method according to claim 12, wherein said agricultural vehicle further includes a location sensor coupled to said controller and configured to provide a location signal to said controller.

14. The method according to claim 13, wherein said step of initiating the vertical adjustment of the header is initiated by said controller in response to a location determined by said location sensor.

* * * * *